(12) United States Patent
Li (10) Patent No.: US 8,577,941 B2
(45) Date of Patent: Nov. 5, 2013

(54) VIRTUAL DATABASE SYSTEM (75) Inventor: Richard Ding Li, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 642 days.

(21) Appl. No.: 12/199,756

(22) Filed: Aug. 27, 2008

(65) Prior Publication Data
US 2010/0057745 A1    Mar. 4, 2010

(51) Int. Cl.
G06F 12/00     (2006.01)
G06F 17/30     (2006.01)

(52) U.S. Cl.
USPC .......................................... 707/831; 707/636

(58) Field of Classification Search
USPC ................... 707/831, 636, 795, 793, 999.107
See application file for complete search history.

(56) References Cited

U.S. PATENT DOCUMENTS

| | | | |
|---|---|---|---|
| 7,120,690 B1 * | 10/2006 | Krishnan et al. | 709/225 |
| 2001/0044793 A1 * | 11/2001 | Ellsworth et al. | 707/999.003 |
| 2003/0182264 A1 * | 9/2003 | Wilding et al. | 707/999.001 |
| 2007/0143369 A1 * | 6/2007 | Uppala | 707/204 |
| 2008/0114801 A1 * | 5/2008 | Singh | 707/102 |

* cited by examiner

Primary Examiner — Etienne Leroux
Assistant Examiner — Bryan Walker
(74) Attorney, Agent, or Firm — Lowenstein Sandler LLP (57) ABSTRACT A method and apparatus for distributing a database implementation across multiple servers. In one embodiment, the method includes receiving information identifying an implementation of a database having a database schema, identifying the number of database servers to host the database implementation, and analyzing usage characteristics of the database schema. The method further includes distributing the database implementation over the identified number of database servers based on the analysis of the usage characteristics, and providing access to the database implementation for one or more applications, the applications being unaware of the database servers hosting the database implementation.

24 Claims, 6 Drawing Sheets

VIRTUAL DATABASE SYSTEM

TECHNICAL FIELD

Embodiments of the present invention relate to database management, and more specifically to distributing a database implementation across multiple servers.

BACKGROUND

In modern n-tier architectures, database scalability can be achieved by increasing the capacity of the database server. The advantage of this approach is simplicity because it does not require any architectural changes. However, larger servers are usually more expensive per unit of performance than smaller servers, and have fundamental scalability limitations.

Database scalability can also be achieved using a horizontal partitioning approach that divides a large database into separate smaller databases. This approach, however, requires rewriting existing applications to intelligently access different databases. In addition, this approach complicates the development of new applications by requiring extra logic enabling access to multiple databases.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for distributing a database implementation across multiple servers. In particular, in one embodiment, a virtual database system is provided that includes a user interface allowing a user to provide information identifying an implementation of a database and to specify the number of database servers to host the database implementation. The information identifying the database implementation may specify a schema of the database and various database elements. The database schema refers to metadata defining database elements and their relationships, and the database implementation refers to a physical collection of elements defined in the database schema. The database elements may include, for example, database tables, indexes, stored procedures, views, etc.

Next, the virtual database system analyzes usage characteristics of the database schema. This analysis may include, for example, the evaluation of the referential integrity rules defined by the database schema to determine which tables should be co-located, the evaluation of common data requests (e.g., database queries, updates, inserts, etc.) to determine which tables should be co-located to provide maximum performance of the common queries and/or updates, the evaluation of stored procedures to determine whether a stored procedure should be co-located with the tables referenced by the stored procedure, the evaluation of various database tables to find which tables can be cached for maximum performance, etc.

The virtual database system uses the analysis of the usage characteristics to decide how to distribute the database implementation over the specified number of database servers. Once the database implementation is distributed, the virtual database system provides access to database data for various applications. The applications do not need to be modified to access database data distributed over multiple servers and do not need to be aware of the specific distribution of the database implementation.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
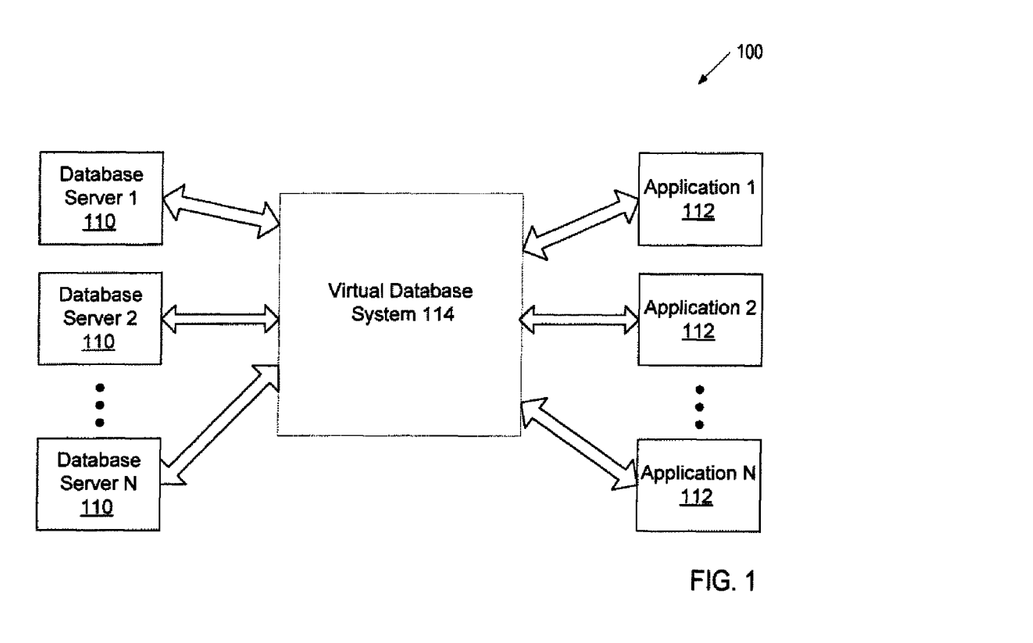
FIG. 1 illustrates an exemplary network architecture in which embodiments of the present invention may operate.

FIG. 1 illustrates an exemplary network architecture 100 in which embodiments of the present invention may operate. The network architecture 100 may include a virtual database system 114 that may be hosted by a single server or multiple servers in a clustering-type environment, and/or by one or more physical machines. The virtual database system 114 may be coupled with database servers 110 via a network (e.g., a private network such as a local area network (LAN), public network such as Internet, etc.). The number of database servers 110 may be specified by a user (e.g., a database administrator (DBA)) or be predefined. The virtual database system 114 receives information identifying an implementation of a database from a client device (not shown) such as a console or personal computer of the DBA. The information identifying the database implementation may specify a schema of the database and various database elements such as stored procedures, indexes, views, etc. In response, the virtual database system 114 may determine how to distribute the implementation of the database over the database servers 110, and then facilitate the distribution of the database implementation. As will be discussed in more detail below, the virtual database system 114 determines an optimal distribution of the database implementation based on usage characteristics associated with the database schema. The distribution of the database implementation may be accomplished by creating mappings between the database elements (e.g., tables, stored procedures, views, etc.) and the database servers 110, and submitting a request to the database's programming interface (e.g., JDBC (Java Database Connectivity), ODBC (Open Database Connectivity), etc.) to populate the database elements on corresponding database servers 110 in accordance with the database schema. The above distribution results in each database server 110 hosting specific database elements.

The virtual database system 114 is also coupled to applications 112 via a network (e.g., a private network such as LAN, public network such as Internet, etc.). The applications 112 may be hosted by one or more devices (e.g., servers, clients, etc.) and may perform functionality that requires, at least in part, access to database data stored on the database servers 110. However, the applications 112 are unaware of the database servers 110 and of the specific distribution of the database implementation over the database servers 110. The applications 112 communicate data requests (e.g., data queries, updates, inserts, etc.) to the virtual database system 114 and treat the virtual database system 114 as the actual database implementation. In other words, the virtual database system 114 operates as an intermediary between the database servers 110 and the applications 112, and provides a single read/writable view of the database implementation residing on multiple database servers. The applications 112 may be multiple instances of a single application or multiple different applications using the same database.

Figure 2:
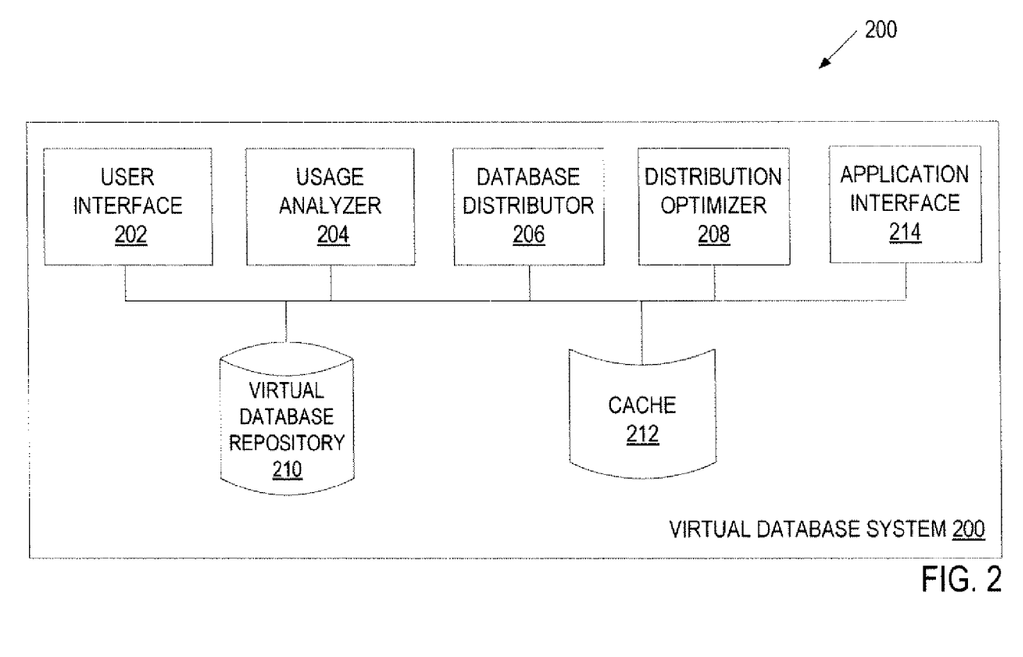
FIG. 2 is a block diagram of one embodiment of a virtual database system.

FIG. 2 is a block diagram of one embodiment of a virtual database system 200. The virtual database system 200 may include a user interface 202, a usage analyzer 204, a database distributor 206, a distribution optimizer 208, an application interface 214, a virtual database repository 210, and a cache 212.

The user interface 202 allows a user to import a database implementation including a database schema and database elements by, for example, specifying the URL(s) of the database schema and the database elements or the name(s) of the file(s) containing the database schema and the database elements. The database schema includes metadata that defines database elements and their relationships such as referential integrity rules, etc. The database elements may include, for example, database tables, indexes, stored procedures, views, etc. The database schema is stored in the virtual database repository 210. The virtual database repository 210 may be any data storage that can be hosted by the virtual database system 200 or accessible to the virtual database system 200 (e.g., via a private or public network).

The user interface 202 may also allow a user (e.g., a DBA) to specify the number of database servers that should host the database implementation. Alternatively, the virtual database system 200 may calculate the number of database servers automatically using the size of the database implementation or some other parameter specified by the user via the user interface 202. The database implementation refers to a physical collection of the database elements defined in the database schema.

The usage analyzer 204 evaluates the database schema and the usage characteristics of the database schema. In particular, the usage analyzer 204 may evaluate the referential integrity rules defined by the database schema to determine which tables should be co-located (if they reference each other) and which tables can be hosted by different servers. In addition, the usage analyzer 204 may determine which data requests are likely to be common for the database schema 210 and which layout of the database implementation can provide maximum performance of these data requests (e.g., which tables need to be co-located for the common data requests). A data request can be any type of query, update, insert, or data definition command including but not limited to the full semantics of SQL. The usage analyzer 204 may also determine which database tables can be cached in cache 212 to improve performance (e.g., if a database table is static or is likely to be commonly accessed).

Upon determining an optimal layout of the database tables across the database servers, the usage analyzer 204 may evaluate the other database components such as stored procedures, views, indexes, etc. For example, the usage analyzer 204 may review the stored procedures to determine whether a stored procedure references tables to be hosted by the same database server or different database servers. If the stored procedure only references the tables that will be hosted by the same database server, the stored procedure should be placed on the same server. Alternatively, if the stored procedure references tables that will reside on different database servers, the stored procedure should reside in the virtual database system 200 (e.g., cache 212).

Upon completing the analyses, the usage analyzer 204 may create a mapping for the resulting layout of the database implementation (mapping between the database elements and the database servers storing the corresponding database elements). This mapping may be added to the virtual database repository 210 or be stored separately (e.g., in a separate table or file). In one embodiment, prior to creating the mapping, the usage analyzer 204 evaluates the storage characteristics of the database servers, and determines if the resulting layout needs to be adjusted based on the storage characteristics. For example, if a first database server has slower storage than a second database server, database tables that are less performance sensitive can be placed on the first database server. In another example, if a first database server has more storage space than a second database server, some of the elements may be moved from the second database server to the first database server.

In one embodiment, the user may be allowed to review the resulting layout of the database implementation and provide manual updates to the resulting layout (e.g., via the user interface 202). In response, the usage analyzer 204 may determine performance characteristics for the updated layout of the database implementation. The performance characteristics may include, for example, the frequency with which a table is used, the importance of a table in performance (e.g., tables designated as reports-type tables can be slower than tables used in real-time), the frequency with which a table is joined with other tables, etc. These performance characteristics can be displayed to the user (e.g., via the user interface 202) as hints, and the user can cancel or confirm the manual layout updates in response.

The database distributor 206 is responsible for facilitating the distribution of the database implementation across multiple database servers according to the recorded mappings (between the database elements and the database servers) and the database schema. For example, the database distributor 206 may specify the mappings and the database schema and submit a request to populate the database elements via a database interface such as JDBC or ODBC on corresponding database servers in accordance with the database schema.

The distribution optimizer 208 periodically optimizes the layout of the database implementation based on the performance of the current database implementation. For example, the distribution optimizer 208 may log all data requests received from external applications, periodically determine which of these data requests are common, and re-distribute the database implementation if needed to improve performance of the common data requests. The distribution optimizer 208 may also track the usage of the database tables, and determine which database tables can be added or removed from the cache 212 based on their usage. In one embodiment, the distribution optimizer 208 also considers storage characteristics of the database servers.

The application interface 214 provides a single read/writable view of the database implementation to various applications. Upon receiving a data request from an application, the application interface 202 directs it to a corresponding database server based on the recorded mapping. The applications are unaware of the existence of multiple database servers and of the specific distribution of the database implementation. That is, the applications are provided database access that is real-time, unrestricted (e.g., includes read, write, create, etc. operations) and completely transparent.

Figure 3:
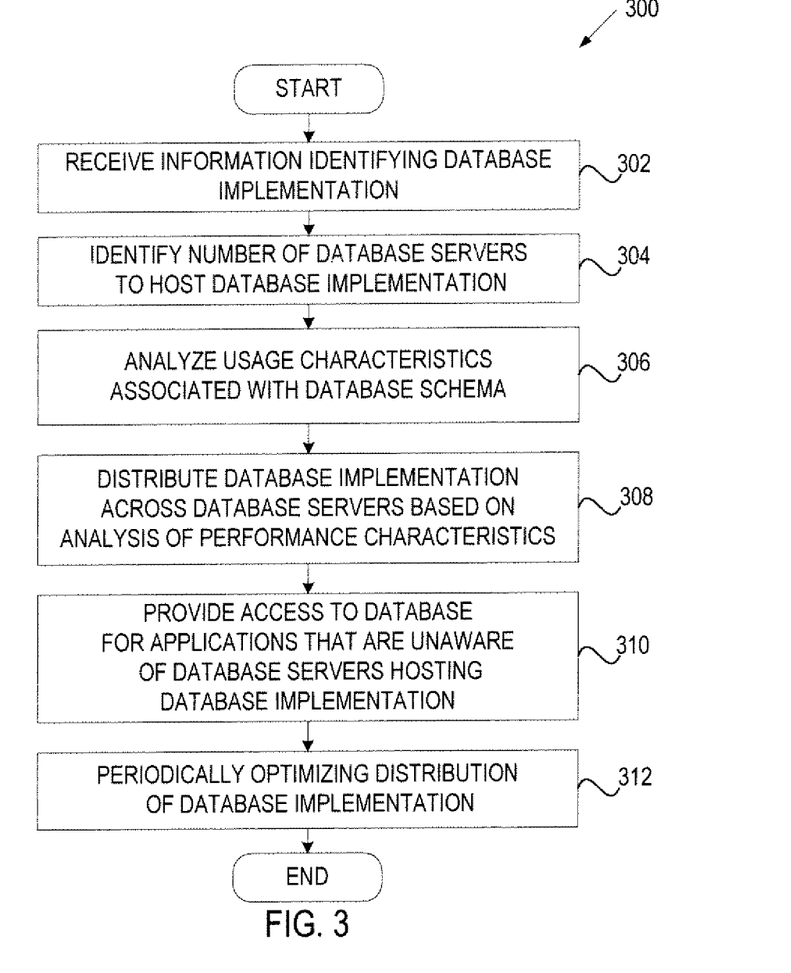
FIG. 3 is a flow diagram of one embodiment of a method for distributing the database implementation across multiple servers.

FIG. 3 is a flow diagram of one embodiment of a method 300 for distributing the database implementation across multiple servers. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a virtual database system, such as virtual database system 114 of FIG. 1.

Referring to FIG. 3, method 300 begins with processing logic receiving information identifying an implementation of a database (block 302). The information identifying the database implementation may be received when the user specifies the identifier(s) of the schema and the database elements (e.g., URL(s), file name(s), etc.) and submits a request to import the database implementation in the user interface.

At block 304, processing logic identifies the number of database servers that should host the database implementation. The number of the database servers may be specified by the user or determined automatically based on parameters of the database implementation (e.g., size, memory or CPU usage, etc.).

At block 306, processing logic analyzes the usage characteristics associated with the database schema. As discussed above, the usage characteristics may pertain to referential integrity rules, performance of common data requests, the contents of database tables (static vs. dynamic), performance of stored procedures, etc.

At block 308, processing logic distributes the database implementation across the identified number of database servers based on the usage characteristics analysis. In one embodiment, the distribution is based on schema not content. That is, each database server hosts complete database elements (e.g., hosting the whole database table as opposed to splitting a single database table among multiple database servers).

At block 310, processing logic provides access to the database implementation for external applications. The applications are unaware of the database implementation distribution and do not need to be modified to access database data residing on multiple database servers.

Figure 4A:
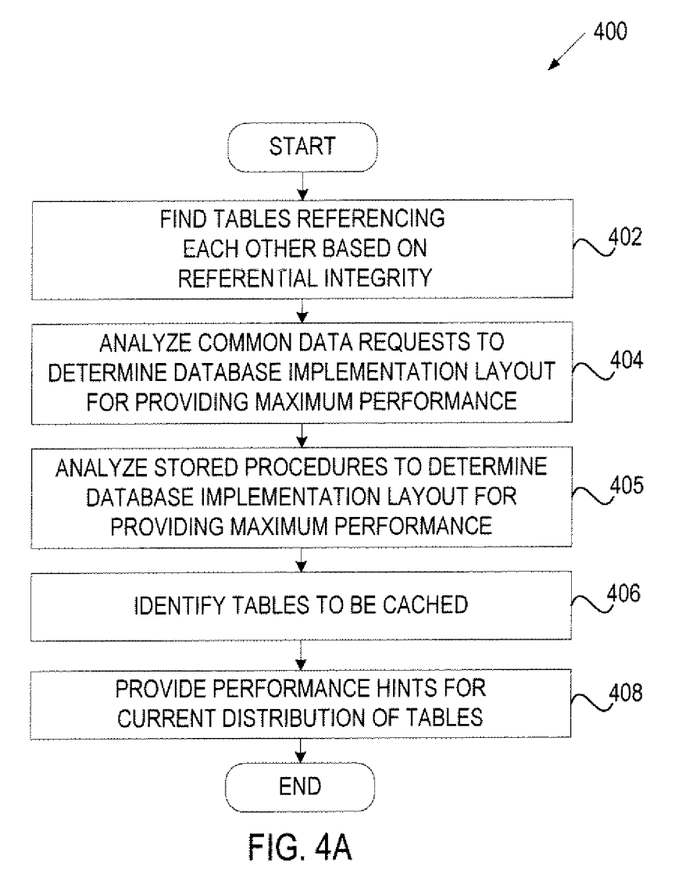
FIG. 4A is a flow diagram of one embodiment of a method for determining an optimal distribution of the database implementation.

FIG. 4A is a flow diagram of one embodiment of a method 400 for determining an optimal distribution of the database implementation. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 400 is performed by a virtual database system, such as virtual database system 114 of FIG. 1.

Referring to FIG. 4A, method 400 discusses usage characteristics analysis in more detail. At block 402, processing logic evaluates the referential integrity rules defined in the database schema to determine which tables should be co-located (tables referencing each other). At block 404, processing logic determines which data requests are likely to be common and determines the layout of the database implementation that can provide maximum performance of these data requests (e.g., determines which tables should be co-located for these data requests).

At block 405, processing logic identifies tables that should be cached for better performance (e.g., tables with static data or tables that are likely to be commonly accessed). At block 406, processing logic analyzes stored procedures to determine the database implementation layout that can provide maximum performance of the stored procedures. In particular, processing logic determines whether a stored procedure only references tables residing on a single database server. If so, processing logic maps the stored procedure to the same database server. If not (i.e., the stored procedure references tables residing on different database servers), processing logic caches the stored procedure in local memory (e.g., cache of the virtual database system).

Once the database implementation is distributed across multiple database tables, processing logic can provide performance hints for this database implementation (block 408). The performance hints may include, for example, the frequency with which a table is used, the importance of a table in performance (e.g., tables designated as reports-type tables can be slower than tables used in real-time), the frequency with which a table is joined with other tables, etc. Processing logic may display the performance hints to the user via a user interface, and may allow the user to manually update the layout of the database implementation. Upon receiving the updates, processing logic may determine performance hints for the updated layout, and display them to the user. The user may change the layout a few times until the user is satisfied with the performance hints.

Figure 4B:
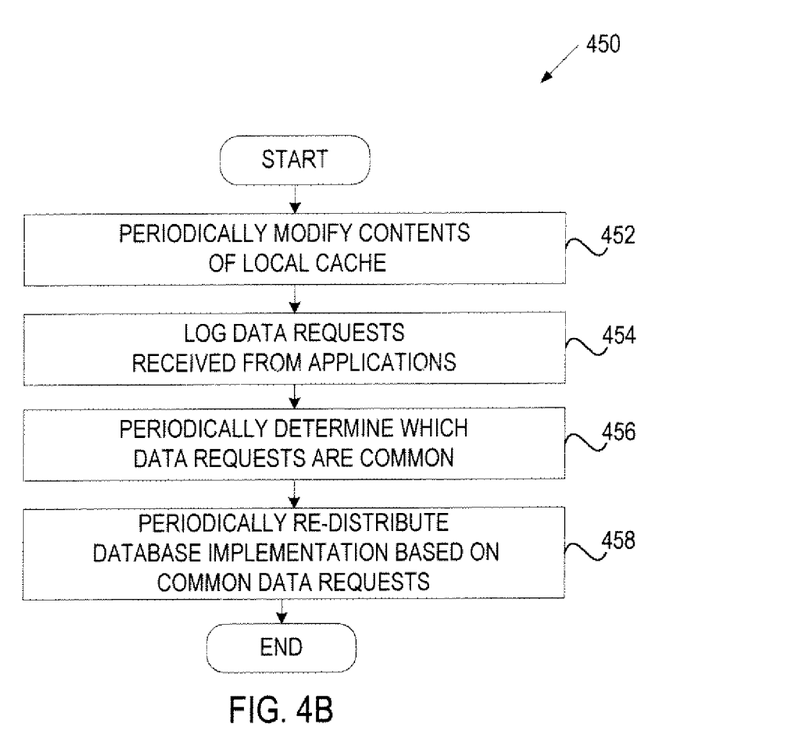
FIG. 4B is a flow diagram of one embodiment of a method for optimizing the distribution of the database implementation.

FIG. 4B is a flow diagram of one embodiment of a method for optimizing the distribution of the database implementation. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 450 is performed by a virtual database system, such as virtual database system 114 of FIG. 1.

Referring to FIG. 4B, method 450 begins with processing logic periodically modifying the contents of the local cache (block 452). These modifications can be performed by tracking tables being accessed in response to data queries, determining which tables are accessed frequently, and moving these tables to the local cache if they reside on database servers.

At block 454, processing logic logs data requests received from applications. At block 456, processing logic determines which of these data requests are common and decides which database tables need to be re-distributed to provide maximum performance of the common data requests.

At block 456, processing logic re-distributes the database tables based on the decision made at block 456.

Method 450 can be repeated periodically (e.g., using a predefined time interval or a time interval specified by the DBA).

Figure 5:
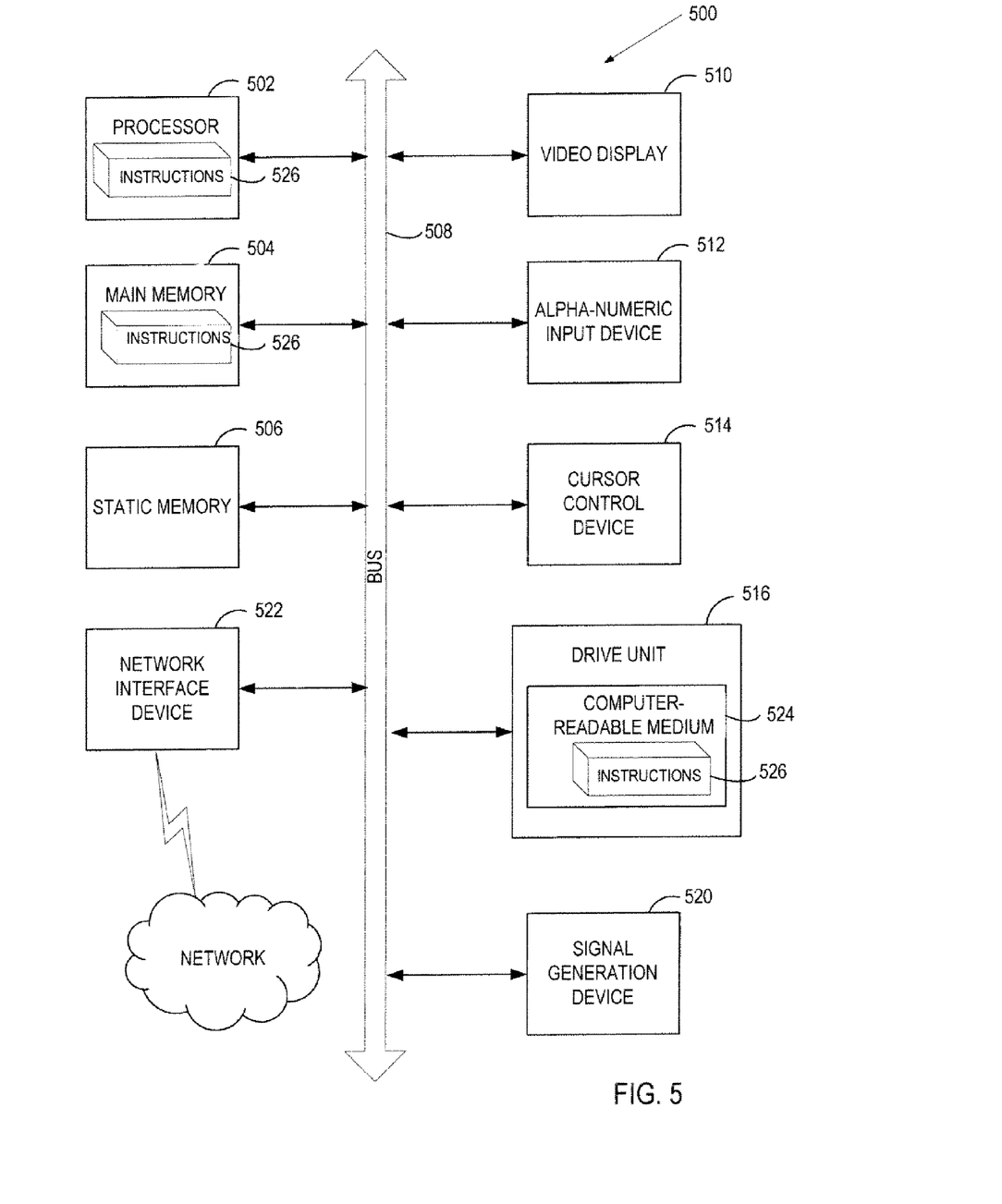
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.) and a secondary memory (e.g., a data storage device or drive unit 516), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic (e.g., instructions 526) for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The drive unit 516 may include a machine-readable storage medium (or more specifically a computer-readable storage medium) 524 on which is stored one or more sets of instructions 526 (such as software) embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving, by a processing device executing a virtual database system, information identifying a database implementation having a database schema and a plurality of database elements;
identifying a plurality of database servers to host the database implementation;
analyzing usage characteristics of the database schema, the analyzing comprising identifying common data requests;
distributing, by the processing device, the database implementation over the plurality of database servers based on the usage characteristics of the database schema, the distributing comprising:
determining a layout of the database implementation for providing maximum performance of the common data requests, wherein the layout specifies that first tables comprising first database elements of the plurality of database elements are to be collocated with second tables comprising second database elements of the plurality of database elements; and populating, based on the layout, the plurality of database servers with the plurality of database elements so that at least one database server of the plurality of database servers contains different database elements of the plurality of database elements than other database servers of the plurality of database servers, wherein the first tables and second tables are collocated on a single database server of the plurality of database servers; and providing access to the database implementation for one or more applications by the virtual database system.

2. The method of claim 1 wherein identifying the plurality of database servers comprises:

receiving user input specifying the plurality of database servers.

3. The method of claim 1, wherein:

the usage characteristics of the database schema pertain to referential integrity; and analyzing the usage characteristics comprises finding tables that reference each other.

4. The method of claim 1 wherein analyzing the usage characteristics of the database schema comprises:

identifying one or more database tables that are to be cached to improve performance.

5. The method of claim 4 wherein the one or more of the plurality of database tables that are to be cached comprise one or more of static tables and commonly accessed tables.

6. The method of claim 1 wherein determining the layout of the database implementation comprises:

determining which tables need to be co-located for the common data requests.

7. The method of claim 1 wherein analyzing the usage characteristics of the database schema comprises:

analyzing stored procedures associated with the database schema; and for each stored procedure, determining whether database tables referenced by the stored procedure are hosted by one of the database servers or by two or more of the database servers.

8. The method of claim 7 wherein distributing the database implementation over the identified plurality of database servers further comprises:

if the database tables referenced by the stored procedure are hosted by one of the database servers, storing the stored procedure on the hosting database server; and if the database tables referenced by the stored procedure are hosted by two or more of the database servers, storing the stored procedure on a virtual database server.

9. The method of claim 1 further comprising:

allowing a user to manually update the layout of the database implementation over the identified plurality of database servers; and providing performance hints for the updated layout.

10. The method of claim 1 further comprising:

periodically optimizing the layout of the database implementation over the identified plurality of database servers.

11. The method of claim 10 wherein periodically optimizing the layout of the database implementation comprises:

periodically modifying contents of a local cache storing one or more database tables;

logging additional data requests received from the one or more applications;

periodically determining which of the additional data requests are additional common data requests; and periodically re-distributing the layout of the database implementation based on the additional common data requests.

12. The method of claim 1 further comprising:

storing mappings between the database implementation and the database servers.

13. A system comprising:

a memory; and a processing device coupled to the memory, the processing device configured to:

receive information identifying a database implementation having a database schema and a plurality of database elements identify a plurality of database servers to host the database implementation;

analyze usage characteristics associated with the database schema, the analyzing comprising identifying common data requests;

distribute the database implementation over the identified plurality of database servers based on of the usage characteristics of the database schema, the distributing comprising:

determining a layout of the database implementation for providing maximum performance of the common data requests, wherein the layout specifies that first tables comprising first database elements of the plurality of database elements are to be collocated with second tables comprising second database elements of the plurality of database elements; and populating, based on the layout, the plurality of database servers with the plurality of database elements so that at least one database server of the plurality of database servers contains different database elements than other database servers of the plurality of database servers, wherein the first tables and second tables are collocated on a single database server of the plurality of database servers; and provide access to the database implementation for one or more applications.

14. The system of claim 13 comprising one or more virtual schema servers in a clustering-type environment.

15. The system of claim of 13 comprising a plurality of physical machines.

16. The system of claim 13 wherein the processing device is to further configured to analyze the usage characteristics by at least one of finding tables that reference each other, identifying one or more database tables that are to be cached to improve performance, and determining an optimal location of stored procedures based on tables referenced by the stored procedures.

17. The system of claim 13 wherein the processing device is further configured to allow a user to manually update the layout of the database implementation over the identified number of database servers, and to provide performance hints for the updated layout.

18. The system of claim 13, wherein the processing device is further configured to periodically optimize the layout of the database implementation over the identified plurality of database servers.

19. A non-transitory computer readable storage medium having instructions for a virtual database system stored thereon that, when executed by a processing device, cause the processing device to perform a method comprising:

receiving, by the processing device, information identifying an implementation of a database having a database schema and a plurality of database elements;

identifying a plurality of database servers to host the database implementation;

analyzing usage characteristics of the database schema, the analyzing comprising identifying common data requests;

distributing, by the processing device, the database implementation over the plurality of database servers based on of the usage characteristics of the database schema, the distributing comprising:

determining a layout of the database implementation for providing maximum performance of the common data requests, wherein the layout specifies that first tables comprising first database elements of the plurality of database elements are to be collocated with second tables comprising second database elements of the plurality of database elements; and     populating, based on the layout, the plurality of database servers with the plurality of database elements so that at least one database server of the plurality of database servers contains different database elements than other database servers of the plurality of database servers, wherein the first tables and second tables are collocated on a single database server of the plurality of database servers; and providing access to the database implementation for one or more applications by the virtual database system.

20. The non-transitory computer readable storage medium of claim 19 wherein analyzing the usage characteristics further comprises at least one of finding tables that reference each other, identifying one or more database tables that are to be cached to improve performance, and determining an optimal location of stored procedures based on tables referenced by the stored procedures.

21. The non-transitory computer readable storage medium of claim 19 wherein the method further comprises:

allowing a user to manually update the layout of the database implementation over the identified plurality of database servers; and     providing performance hints for the updated layout.

22. The non-transitory computer readable storage medium of claim 19 wherein the method further comprises:

periodically optimizing the layout of the database implementation over the identified plurality of database servers.

23. The non-transitory computer readable storage medium of claim 19 wherein periodically optimizing the layout of the database implementation comprises:

periodically modifying contents of a local cache storing one or more database tables;

logging additional data requests received from the one or more applications;

periodically determining which of the additional data requests are additional common data requests; and     periodically re-distributing the layout of the database implementation based on the additional common data requests.

24. The non-transitory computer readable storage medium of claim 19 wherein the method further comprises:

storing mappings between the database implementation and the plurality of database servers.

\* \* \* \* \*